United States Patent
Daniel

(10) Patent No.: US 12,132,330 B2
(45) Date of Patent: Oct. 29, 2024

(54) AIRCRAFT WITH WIRELESS PROVISION OF POWER

(71) Applicant: Airbus Defence and Space GmbH, Taufkirchen (DE)

(72) Inventor: Christian Daniel, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 81 days.

(21) Appl. No.: 17/912,338

(22) PCT Filed: Jan. 27, 2021

(86) PCT No.: PCT/EP2021/051852
§ 371 (c)(1),
(2) Date: Sep. 16, 2022

(87) PCT Pub. No.: WO2021/185506
PCT Pub. Date: Sep. 23, 2021

(65) Prior Publication Data
US 2023/0141562 A1    May 11, 2023

(30) Foreign Application Priority Data

Mar. 18, 2020    (DE) ..................... 10 2020 107 527.8

(51) Int. Cl.
*H02J 50/50*    (2016.01)
*B64D 47/00*    (2006.01)
(Continued)

(52) U.S. Cl.
CPC ............ *H02J 50/502* (2020.01); *B64D 47/00* (2013.01); *B64F 1/00* (2013.01); *H02J 50/27* (2016.02);
(Continued)

(58) Field of Classification Search
CPC ...... H02J 50/502; H02J 50/27; H02J 2310/44; H02J 50/80; H02J 50/20; B64D 47/00;
(Continued)

(56) References Cited

U.S. PATENT DOCUMENTS 3,159,831 A    12/1964    Muth
4,090,196 A    5/1978    Stevenson, Jr.
(Continued)

FOREIGN PATENT DOCUMENTS

WO    2015121204 A1    8/2015

OTHER PUBLICATIONS

International Search Report for Application No. PCT/EP2021/051852 mailed Apr. 23, 2021, pp. 1-4.

*Primary Examiner* — Lincoln D Donovan
*Assistant Examiner* — Alex W Lam
(74) *Attorney, Agent, or Firm* — Lerner David LLP

(57) ABSTRACT

An aircraft has a first antenna arrangement, a payload and a processing unit. The first antenna arrangement is designed to wirelessly receive electromagnetic signals. The processing unit is coupled to the first antenna arrangement, on the one hand, and to the payload, on the other hand. The processing unit is designed to modulate an electromagnetic signal received by the first antenna arrangement and thereby to generate a first modulated signal and to forward it to the payload. The payload is designed to use the first modulated signal as working signal. A radiofrequency power signal on an uplink is thus remodulated into a payload working signal, such that the payload working signal is able to be used directly by the payload without rectification into a DC voltage.

10 Claims, 3 Drawing Sheets

(51) Int. Cl.
*B64F 1/00* (2024.01)
*H02J 50/27* (2016.01)
*H04B 5/79* (2024.01)

(52) U.S. Cl.
CPC .......... *H04B 5/79* (2024.01); *B64D 2221/00* (2013.01); *H02J 2310/44* (2020.01)

(58) Field of Classification Search
CPC ..... B64D 2221/00; B64F 1/00; H04B 5/0037; G01S 13/758; G01S 13/88; G01S 13/933; G01S 13/75
See application file for complete search history.

(56) References Cited

U.S. PATENT DOCUMENTS

| | | |
|---|---|---|
| 2011/0266995 A1 | 11/2011 | Winfield et al. |
| 2013/0063083 A1* | 3/2013 | Park ................. H02J 50/12 320/108 |
| 2016/0351993 A1 | 12/2016 | Strauss et al. |
| 2017/0018195 A1* | 1/2017 | Bernhardt .............. H04R 5/033 |

\* cited by examiner

AIRCRAFT WITH WIRELESS PROVISION OF POWER

CROSS-REFERENCE TO RELATED APPLICATIONS

The present application is a national phase entry under 35 U.S.C. § 371 of International Application No. PCT/EP2021/051852 filed Jan. 27, 2021, published in German, which claims priority from German Application No. 102020107527.8 filed Mar. 18, 2020, the disclosures of which are incorporated herein by reference.

FIELD OF THE INVENTION

The present description relates in general to the technical field of aviation. The description relates in particular to an aircraft to which power is transmitted wirelessly via a radiofrequency link in order to operate energy consumers or payloads located on board the aircraft.

BACKGROUND OF THE INVENTION

Aircraft, free-flying or coupled to a towing vehicle, may be designed to remain in the air for periods of differing length. This requires a certain amount of energy that is drawn from energy storage units or may be provided from other sources, such as for example photovoltaic installations or from a towing vehicle via cables. The energy is required to operate a drive system of the aircraft and components on board the aircraft. The power demand may in this case fluctuate greatly, for example depending on the components that are present and used and also depending on a type of operation of these components.

Light aircraft and ultralight aircraft are distinguished by a very low weight in relation to their geometric dimensions. The low weight is a result of various properties and requirements on the design of an ultralight aircraft: Energy is provided for example via a photovoltaic installation, meaning that an energy storage unit that has been filled beforehand is not a limiting factor; an energy storage unit having a predefined capacity is provided in order to be able to bridge the phases without solar irradiation; the structure of the ultralight aircraft is designed for a low weight; few and lightweight components and payloads are installed on board the ultralight aircraft. Generally speaking, an aircraft may be a free-flying, tethered aircraft floating in the manner of a balloon and equipped with a dynamic or static lift mechanism.

Light aircraft may be used for example as observation systems by virtue of being equipped with observation devices and/or transmission devices that use electromagnetic emissions and immissions. Light aircraft may likewise represent a node in a communication link, in particular a wireless communication link, when they are equipped with the appropriate transmission devices.

It may be the case that observation devices and transmission devices have an energy demand that is not able to be covered by the on-board energy storage units and energy reserves or any existing external energy storage units that are accessible to the aircraft.

DISCLOSURE OF THE INVENTION

The object of the invention may therefore be considered that of supplying power to and operating a payload, in particular a payload that uses radiofrequency signals, arranged on board an aircraft with limited energy resources.

This object is achieved by the subject matter of the independent claim. Further embodiments will become apparent from the dependent claims and from the following description.

According to one aspect, an aircraft is described. The aircraft has a first antenna arrangement, a payload and a processing unit. The first antenna arrangement is designed to wirelessly receive electromagnetic signals. The processing unit is coupled to the first antenna arrangement, on the one hand, and to the payload, on the other hand. The processing unit is designed to modulate an electromagnetic signal received by the first antenna arrangement and thereby to generate a first modulated signal and to forward it to the payload. The payload is designed to use the first modulated signal as working signal.

The aircraft described herein may be in particular a lightweight aircraft. A lightweight aircraft in connection with this description is understood in particular to mean an unmanned aircraft having a weight below 200 kg, preferably below 150 kg, more preferably below 100 kg. The weight specifications each refer in particular to the maximum weight during operation of the lightweight aircraft. The lightweight aircraft is distinguished by a wingspan of more than 10 m, preferably more than 15 m, more preferably more than 20 m. The weight of the lightweight aircraft is thus very low in relation to the wingspan. A low ratio between weight and wingspan may of course also be achieved with higher values for weight and wingspan. By way of example, the aircraft may weigh 400 kg with a correspondingly high wingspan of more than 50 m or even more than 70 m. Such an aircraft should of course also be understood to be a lightweight aircraft. The lightweight aircraft may be designed such that it is able to manage a usage period without an intermediate landing on the Earth's surface or another flying platform of several days, for example more than 5, more than 10, or even more than 20 days up to 100 or 200 days. It is likewise conceivable for the lightweight aircraft to access renewable energy sources or solar irradiation in order to generate energy for operating the lightweight aircraft and thereby to enable the long interrupted operating period.

An aircraft in the context of this description may be understood to be in particular an aircraft having the above-described boundary conditions with regard to weight, wingspan and suitability for the stated altitude. However, an aircraft may generally be a flying air vehicle, for example one that is designed to transport a load or what is known as a lighter-than-air air vehicle.

The lightweight aircraft has a drive unit, for example at least one propeller and engines coupled thereto. The engines are preferably electrically operated. In order to provide energy to the engines, provision may be made for a fuel cell or rechargeable batteries on board the lightweight aircraft. The lightweight aircraft may likewise have a photovoltaic installation in order to provide electrical energy based on sunlight. The drive may likewise be achieved using a towing device on the ground.

The lightweight aircraft may in particular be intended and suitable for flight missions in the stratosphere. The stratosphere extends between an altitude of 11 to 50 km above sea level. The lightweight aircraft may for example fly in the bottom third of the stratosphere, that is to say between 11 and 25 km above sea level. A towed light aircraft may in particular fly between the altitude of slightly above 0 km to 1 km above sea level, but also up to 2 km or 3 km above sea level.

The above values for the design and dimensioning (size, weight, etc.) are merely exemplary and given without any restrictive effect. In any case, weight is a relevant parameter in a lightweight aircraft and it is endeavored to keep the weight as low as possible. It is accordingly proposed to transmit the power for a payload wirelessly from a remote station to the aircraft and to convert it there into an AC signal for further use, specifically without any conversion into a DC signal and/or buffer storage of the energy in an energy storage unit. It is accordingly possible to dispense with any (potentially additional) energy storage unit for the payload on board the aircraft, because the power is transmitted wirelessly to the aircraft via the electromagnetic signal and is converted into a modulated AC signal in the aircraft. The modulated AC signal may preferably be used as payload signal directly in the payload. This means that the electromagnetic signal transmitted to the aircraft not only serves purely to transport power, but also represents a preliminary stage of the payload signal for the payload. The signal received wirelessly via the first antenna arrangement experiences only small changes in its form (for example, when the wirelessly received signal is modulated, its frequency and/or its phase and/or its amplitude is changed and/or modulated) and is then used as payload signal for the payload. This change in the form of the signal is referred to here as a modulation.

The payload may contain multiple processing units in which the signals are converted successively in steps. However, it is just as possible for these multiple steps to be carried out in a single processing unit. The processing unit is designed such that it modulates or converts the wirelessly received electromagnetic signal such that, following the modulation or conversion, it is able to be used directly as working signal or payload signal in the payload. The number of components that are used on board the aircraft is thus reduced. It is in particular possible to dispense with an energy storage unit or energy buffer storage unit, which keeps the weight in a lightweight aircraft low.

The first antenna arrangement is arranged on the aircraft and designed to receive signals with a wavelength of a few centimeters, in particular with a wavelength of around 1 cm or around 3 cm. This signal is thus in the range of centimeter waves or microwaves.

These wavelength ranges for the wirelessly transmitted electromagnetic signal make it possible to use antennas with correspondingly small dimensions. In order to transmit the signal from a ground station to an aircraft in the air, due to the large distance, it may however be desirable to generate a highly concentrated signal. For this purpose, an antenna the dimensions of which correspond to a high multiple of the wavelength of the signal may be advantageous. By way of example, it is possible to use an antenna the diameter of which corresponds to at least 100 times, or at least 300 times, or at least 1000 times the wavelength of the electromagnetic signal. These observations apply to the transmit antenna in or on the remote station.

The first antenna arrangement on the aircraft is typically smaller than the transmit antenna and will generally barely, or at most not significantly, exceed the antenna size able to be determined from the physical properties of the signal transmission. The first antenna arrangement may have one or more receive antennas. The first antenna arrangement may be structured from a high-gain antenna able to be directed onto the transmit antenna or multiple small individual low-gain antennas. It is also possible to use concentration by way of electronic phase shifters in order to combine the received electromagnetic signals in a phase-coherent manner. In one variant, the phase correction for individual smaller antennas may also take place in a first power modulator when each smaller antenna is assigned its own (first) power modulator.

The payload is preferably an electrical component, in particular an electrical consumer. However, it should be noted here that the electromagnetic signal does not primarily serve to supply power to the one or more electrical consumers, such as for example the drive, for the operation thereof. Rather, the electromagnetic signal is used in order to directly make available a required RF power for the payload and, following a modulation or transformation step in one or more power modulators, to route it directly, as payload signal (the first modulated signal), to the electrical component, where the payload signal may then be used as it is as working signal.

The processing unit has at least one modulator that modulates the received electromagnetic signal, in particular changes it in terms of its frequency, and forwards the modulated signal to the payload.

This structure renders some components in the energy provision chain obsolete. Because the electromagnetic signal is modulated and a working signal for the payload is thereby generated directly, the working signal does not have to be generated based on energy from an energy storage unit. The electromagnetic signal transmitted to the aircraft is not first buffer-stored in an energy storage unit and then taken from this energy storage unit in order to generate the working signal for the payload. Rather, the electromagnetic signal is converted through modulation in order to obtain the working signal for the payload directly.

By way of example, it may be particularly advantageous to use radar installations or parts thereof (for example emission units and/or reception units), communication or electronic radio intelligence installations and countermeasure installations as payload on high-flying platforms, because high-flying platforms have a large target area. In the case of radar installations, objects may therefore be detected over large distances, as far as what is known as the radar horizon, which may be further away than the optical horizon. However, these large distances require high-power radar transmission signals. A light aircraft is generally able to provide the required powers only for a very short time, and so, according to the principles described herein, another way of supplying power to the payload by way of a highly concentrated microwave signal is proposed.

The approach described herein of directly remodulating an electromagnetic signal to a payload transmission signal with a different frequency without power rectification to DC current may also be used for high-flying communication facilities for sending and forwarding messages. Use in an electronic surveillance and warfare installation installed on a light high-flying aircraft is also possible. Said facilities may be controlled for example by control signals upmodulated to a signal on the uplink with a very high modulation index (AM, FM, PM, PCM) and by a common control unit.

According to one embodiment, the payload is a second antenna arrangement that is designed to use the first modulated signal as payload transmission signal, or the payload is a communication installation that is designed to use the first modulated signal as carrier signal of a wireless communication connection, or the payload is an intelligence installation that is designed to use the first modulated signal as transmitter signal, or the payload is a data processing unit that is designed to use the first modulated signal as voltage and current supply.

The emission unit sends the payload transmission signal and the reception unit receives the payload transmission signals reflected from objects and supplies the received signals for further processing. By way of example, the reception unit may be arranged on a different aircraft than the emission unit. It is possible for the reception unit to be located on a device on the Earth's surface.

As an alternative, the payload may also be a transmission unit in a communication path. It is possible for the first modulated signal to be used as carrier signal of a transmission installation. It is also conceivable for the first modulated signal to serve as operating voltage or operating current or possibly as a clock signal for a computer, which may consist for example of circuits with controlled parameters. As an alternative, the payload may also be an electronic surveillance installation that uses the first modulated signal as carrier signal for a jamming signal transmission installation. Parametric amplifiers or mixers supplied with the first transmission signal may be used to amplify the payload reception signal.

According to a further embodiment, the processing unit has a first modulator. The first modulator is designed to downmodulate the received electromagnetic signal to a lower frequency in order to generate the first modulated signal.

This means that the received electromagnetic signal is transmitted to the aircraft on a higher frequency than the frequency of the working signal for the payload. The electromagnetic signal may in particular be modulated to a working signal frequency, which is advantageous for the use of the payload and the surroundings of the aircraft. By way of example, the working signal may have a wavelength of 10 cm. It is thus suitable as a signal for an emission unit and may be used for example as a radar signal. Signals with this longer wavelength are distinguished by lower attenuation properties in the atmosphere, which are advantageous for use as a radar signal. When a communication installation is used as payload, the working signal for the payload may have suitable or desired frequencies.

The first modulator may have actively controllable components such as semiconductor transistors, semiconductor diodes or tubes and/or passive components with changeable parameters, such as for example inductors, capacitors and/or ohmic resistors.

In one variant, two modulators may be used. These two modulators preferably operate with high efficiency and low power loss in switching operation. Since in this case, in addition to the desired mixing frequencies, a large number of undesirable mixing frequencies and harmonic frequencies may also arise, the modulators themselves or the downstream units or even the transmitting antenna arrangements contain suitable filters for filtering out and suppressing these undesirable frequencies. This is performed simply so that no power is generated and transmitted in undesirable or impermissible frequencies. The modulators, at their inputs, or the preceding units or the receiving antenna groups may also contain suitable filters for forwarding only the desired frequencies and preventing jamming of the overall electronic system caused by other frequencies, also referred to as interfering signals.

In one variant, instead of a single first modulator, a multiplicity of modulators may be used, of which each modulator is in each case assigned to a smaller antenna surface of a larger antenna array, and thus, driven in a phase-shifted manner, the individual received power signals from the individual small antenna surfaces are modulated to a different frequency of the first modulated signal and at the same time added coherently at the output.

According to a further embodiment, the first modulator is designed to apply a coherent modulation in order to generate the first modulated signal.

Coherently modulated signals are used for example in radar installations. Signals designed in this way are thus suitable in particular for use as radar signals for an emission unit.

According to a further embodiment, the processing unit is designed to convert a portion of the received electromagnetic signal into a DC signal and to use the DC signal as energy supply for components of the processing unit.

Provision is basically made for the electromagnetic signal to serve to be changed into a working signal for the payload via a modulation, wherein the payload is then able to use the working signal in this form. It may nevertheless be the case that electrical energy is required to operate the payload or other components on board the aircraft, this electrical energy being provided, in this embodiment, based on the electromagnetic signal transmitted to the aircraft. This may additionally reduce the demand for energy storage units on board the aircraft.

According to a further embodiment, the processing unit has a second modulator, wherein the second modulator is designed to modulate an output signal from the payload to a higher or lower frequency and thereby to generate a second modulated signal.

The first modulator is intended to generate the working signal from the electromagnetic signal. This step may be assigned to a first branch of the processing unit. In a second branch of the processing installation, the output signal from the payload is changed such that it results in a higher-frequency signal and is able to be transmitted to a remote station via a downlink channel.

According to a further embodiment, the processing unit has a data compressor that is designed to process the second modulated signal.

The output signal from the payload and/or the second modulated signal generally require further processing. The output signal from the reception unit thus has to be processed in a radar installation before objects are able to be identified and displayed based on the output signal from the reception unit. This processing may take place on board the aircraft or in the remote station that receives the signal transmitted via the downlink channel. Some processing steps may be carried out on board the aircraft, and others in the remote station.

In one example, the data compressor serves to process the output signals output from a reception unit.

According to a further embodiment, the aircraft has an emission unit and a reception unit, wherein the emission unit is designed to send the working signal as payload transmission signal and wherein the reception unit is designed to receive electromagnetic signals as payload reception signal. The emission unit and the reception unit are for example part of a radar installation or of a communication installation. The processing unit is designed to obtain a signal, the payload reception signal, received from the emission unit, to modulate it, and to transmit the signal thus modulated to the first antenna arrangement in order to allow transmission of this modulated signal to a remote station by way of the first antenna arrangement.

The first antenna arrangement may thus implement both a reception function and a transmission function. The electromagnetic signal is received via an uplink and transmitted to the remote station via a downlink. The second antenna arrangement may be part of a radar installation and perform transmission and reception functions of the radar installation.

According to a further aspect, what is specified is a system that has an aircraft and a ground unit. The aircraft is an aircraft as described herein. The ground unit is arranged outside the aircraft and is designed to wirelessly transmit an electromagnetic signal to the aircraft via an uplink and to receive signals from the aircraft via a downlink.

The ground unit may be a stationary facility in the form of a building or a mobile unit such as a land vehicle or a watercraft. The remote station has an antenna arrangement that is able to transmit and/or receive electromagnetic signals. The remote station is preferably a mobile facility that is able to change its position like the aircraft above it. It is conceivable for the remote station and the aircraft to move relative to one another such that an angle between the Earth's surface at the position of the Earth's surface and a line of sight between the remote station and the aircraft (this line of sight corresponds to the profile of the uplink and/or downlink) is substantially 90°, that is to say that the remote station is located at the point on the Earth's surface above which the aircraft is situated. It is possible for the angle to be in a range of values around 90°, for example 85° to 95°, 80° to 100°, 70° to 110°, for example due to a lateral movement of the aircraft and/or of the vehicle carrying the remote station. The profile of the uplink and/or downlink between the remote station and the aircraft is thus roughly vertical to the Earth's surface and a distance that the wireless connection has to cover through the atmosphere is thus as short as possible in order to keep the attenuation of the electromagnetic signal as low as possible.

The remote station is thus arranged on the Earth's surface in one embodiment.

In other words, the properties of the aircraft may be summarized as follows in one embodiment: an electromagnetic signal is transmitted through short-wave microwave power and discrete active modulation is used to provide the transmission power or a payload signal for an emission unit of a radar installation or a communication facility operating on similar high frequencies or for an electronic intelligence system. A small portion of the received power may be rectified and used for the operation of components such as control and synchronization circuits and the downlink communication. This approach allows the operation of a powerful radar or communication or electronic intelligence facility on a high-flying platform (UAV, Unmanned Aerial Vehicle), which requires essentially its entire or a majority of its own electric power for drive purposes. The electromagnetic signal on the uplink may in this case be concentrated on a high frequency, such that a majority of the microwave power emitted from the remote station is able to be received by the high-flying platform and used for the payload. The aircraft has a downlink that may be less powerful than the uplink. The downlink may be less concentrated or focused, such that the downlink is able to be received and processed further by multiple remote stations.

BRIEF DESCRIPTION OF THE FIGURES

Exemplary embodiments of the invention are discussed in more detail below with reference to the appended drawings. The illustrations are schematic and not true to scale. The same reference signs denote identical or similar elements. In the figures.

DETAILED DESCRIPTION OF EXEMPLARY EMBODIMENTS

Figure 1:
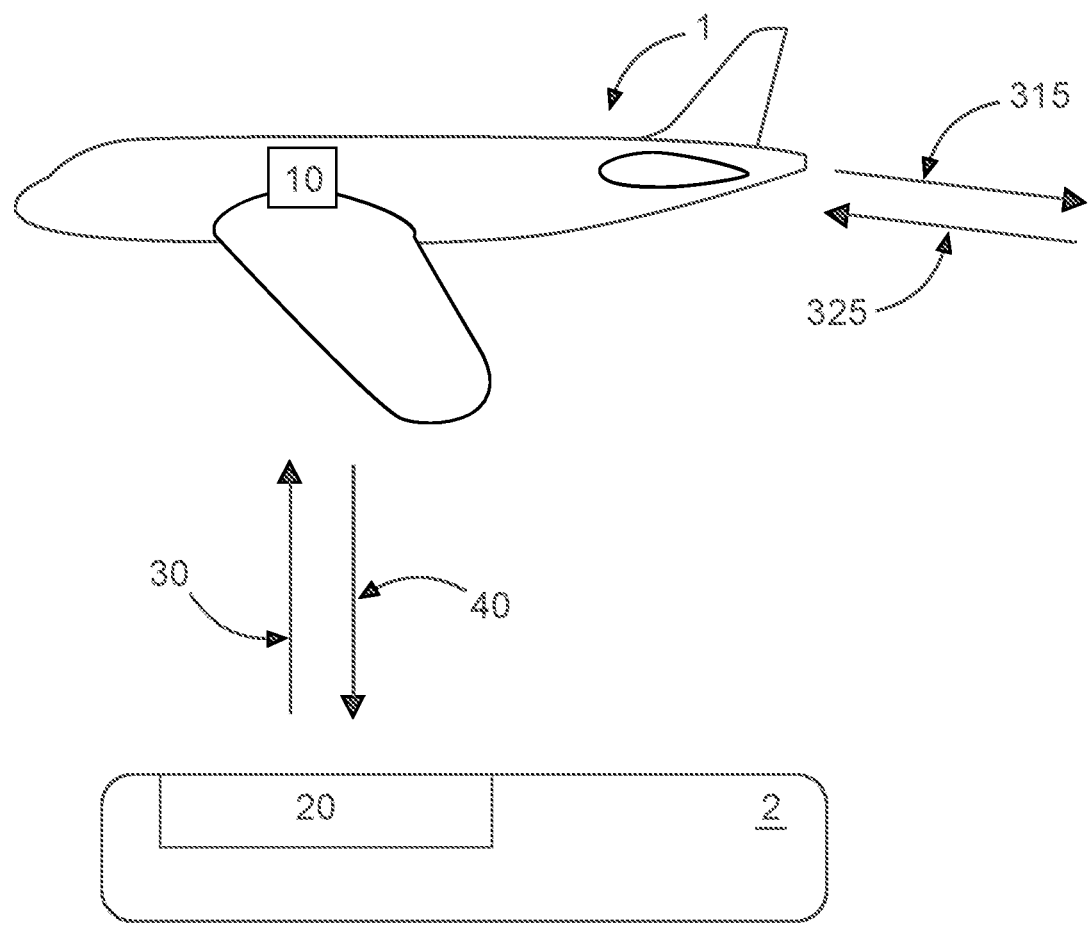
FIG. 1 shows an illustration of an aircraft and a remote station, which implement the functional principle described herein.

FIG. 1 shows an illustration and possible use of an electronic system 10 in an aircraft 1 with a ground unit 2 that contains a remote station 20. The remote station 20 on the ground and the electronic system 10 in the aircraft 1 are connected wirelessly to one another via an RF uplink 30 and RF downlink 40. The downlink 40 may in this case also be connected to multiple remote stations 20.

The system 10 in the aircraft 1 re-emits the RF power received via the uplink 30, without buffer storage or conversion into a DC voltage or a DC current, following a frequency conversion into a payload signal such as a radar signal, communication signal or signal of a jamming application, as RF power 315. In the same way, payload signals such as reflected radar signals, communication signals or intelligence signals 325 are received by the system 10 and, with their frequency converted, transmitted back to the remote station 20 via the downlink 40.

FIG. 1 shows an overview of an aircraft 1 with a system 10 and a ground unit 2 with a remote station 20. In one variant, the aircraft 1 is a light, high-flying unmanned platform, the drive system of which is operated with solar power (drive system and photovoltaic installation not shown), wherein not enough electric power or stored electrical energy is available to operate additional electronic systems such as emission units and communication facility. The available lift for carrying further solar cells and electrical energy storage units or a power supply cable is also highly limited. This required operating power (this comprises both the payload transmission signal 315 and the power for operating the emission unit) is intended here to be irradiated directly, with sufficient power, as radiofrequency power, from a remote station 20 on the Earth's surface, such as for example from a ship or land vehicle having its own sufficient power generation, on a high and therefore readily concentratable high frequency (wavelength for example 0.97 cm, 1 cm or 3 cm), directly to the flying platform via the uplink 30. Use of optical laser radiation is possible. Electromagnetic signals outside the visible optical range may however have advantages in terms of attenuation by the atmosphere and generally weather dependency due to clouds and mist over the sea.

Figure 2:
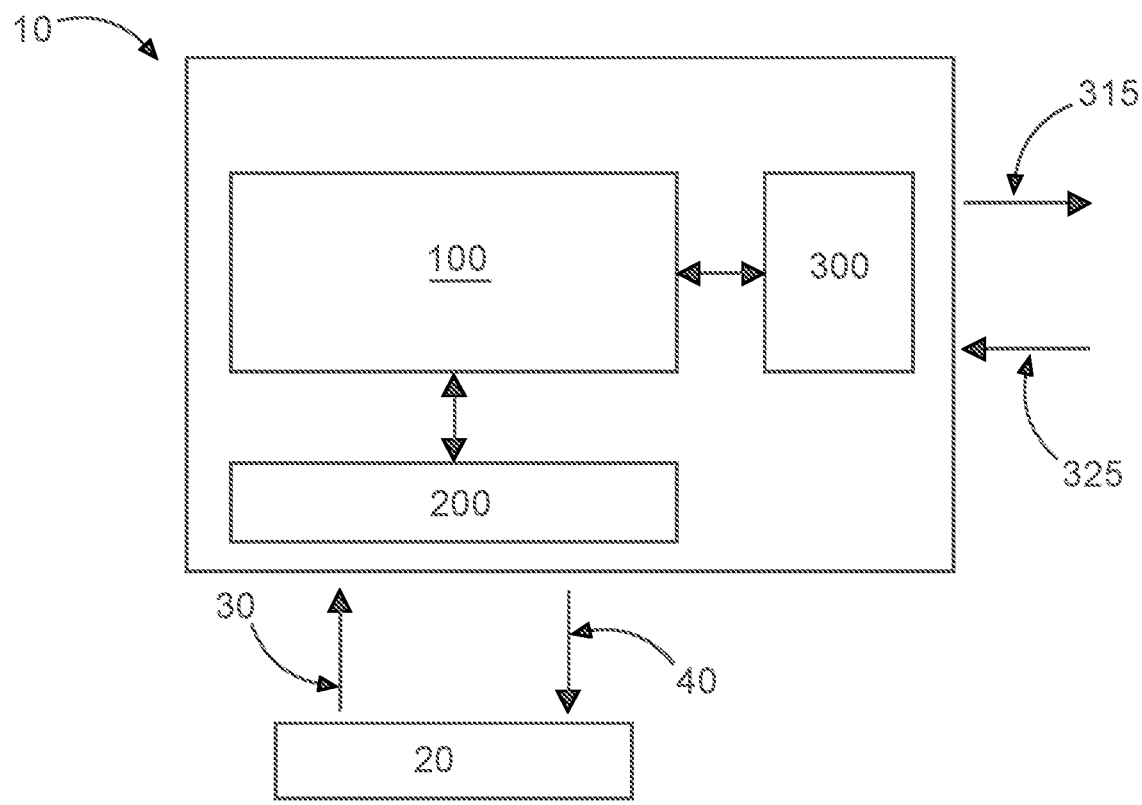
FIG. 2 shows a schematic illustration of an aircraft having a payload and the connection of the aircraft to a remote station.

FIG. 2 shows a schematic illustration of the system 10 shown in FIG. 1 and arranged in the aircraft 1. An electromagnetic signal (may also be referred to as RF power signal) is transmitted to the aircraft via the uplink. The downlink transmits an electromagnetic signal (may also be referred to as return signal) in the opposite direction, that is to say to the remote station 20. A signal is thus transmitted to the remote station 20 for further processing and use via the downlink 40. The frequency of the downlink is generally lower than the frequency of the signal on the uplink, as long as the downlink does not require very high concentration.

The system 10 has a first antenna arrangement 200. The first antenna arrangement 200 is designed to receive the electromagnetic signal on the uplink 30 and to transmit the electromagnetic signal on the downlink 40. The first antenna arrangement 200 may contain one or more antennas, including for frequencies far apart from one another.

The first antenna arrangement 200 is connected to the processing unit 100 in order to transmit received electromagnetic signals to the processing unit 100 and to obtain electromagnetic signals to be transmitted from the processing unit 100.

The system 10 has a payload 300 that uses the first modulated signal as working signal. In one example, the payload 300 may be an emission unit and reception unit for a radar installation.

In one example, the payload may be an antenna installation for a radar installation, wherein the antenna installation of the radar installation has an emission unit and a reception unit. Another payload may also be used. The signal 315 is then generally referred to as payload transmission signal and the signal 325 is generally referred to as payload reception signal.

On the aircraft 1, the focused radiofrequency power irradiated via the uplink 30 is received in a directional manner by distributed receive antennas as part of the first antenna arrangement 200 and modulated directly from the high irradiated frequency to a lower frequency for location or communication by way of active power modulators in the system 10 and re-emitted using suitable antennas (for example emission unit 310). Likewise, the payload reception signals 325 are preprocessed and compressed only to a minimal extent on the aircraft and again modulated in the system 10 by way of the microwave power supply and emitted in less concentrated form via the downlink 40 in the direction of the one or more remote stations 20, where they may be received and processed further by multiple remote stations. Atmospheric attenuation and usual shipping processes are decisive for the selection of the location or communication frequencies and the power transmission.

Figure 3:
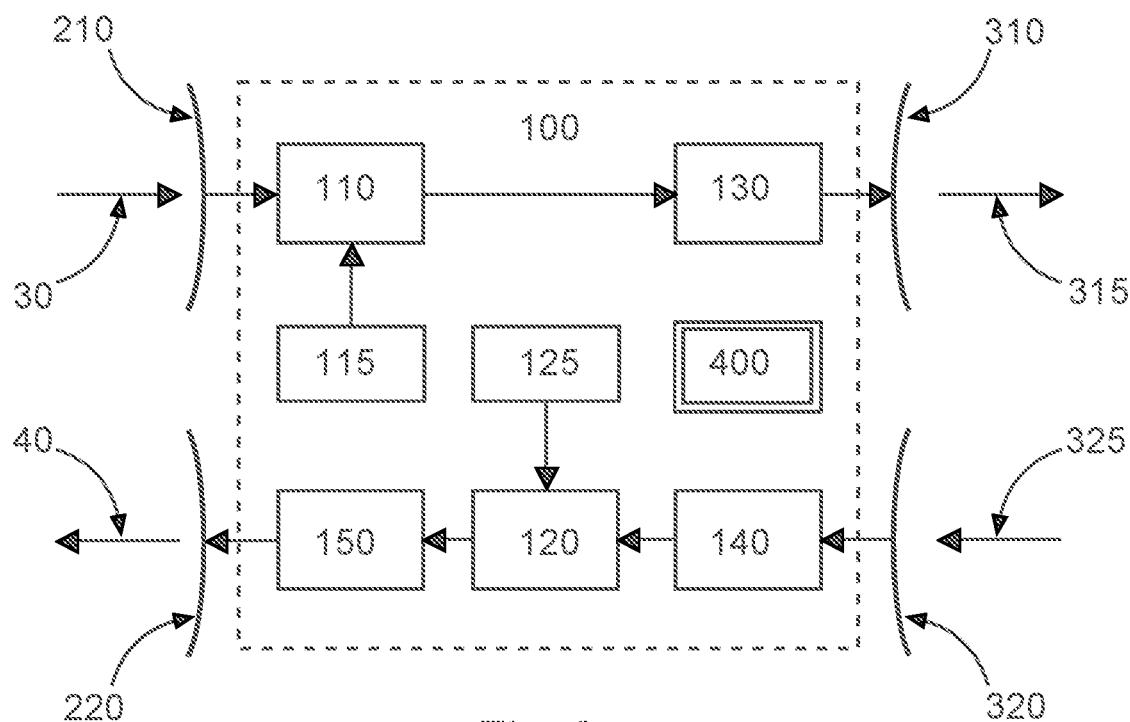
FIG. 3 shows a schematic illustration of the components of an aircraft.

FIG. 3 describes the structure of the processing unit 100 of the system 10 from FIG. 2 in more detail.

The processing unit 100 is connected to a receive antenna 210 and a transmit antenna 220 of the first antenna arrangement 200, on the one hand. The receive antenna 210 receives electromagnetic signals on the uplink 30, and the transmit antenna 220 transmits electromagnetic signals on the downlink 40.

The processing unit has a first modulator 110. The first modulator 110, controlled by the first oscillator 115, modulates the signal on the uplink 30, in order to obtain the payload signal for a further modulator 130 and the emission unit 310 of the payload 300. This payload signal is passed directly and without any detour via a rectification to the emission unit 310 (or a transmission unit of a communication connection). In the example shown in FIG. 3, a further modulator 130, which may be a signal processing unit, for example for synchronization and phase steering, is located between the first modulator 110 and the emission unit 310.

The processing unit 100 furthermore has a second modulator 120. The second modulator obtains and uses the reception signal from the payload 300 and modulates it such that it is able to be transmitted via the downlink 40. An optional reception and signal processing unit 140 is arranged between the second modulator 120 and the receive antenna unit 320 of the payload 300. An optional data compressor 150 is arranged between the second modulator 120 and the transmit antenna 220 of the first antenna arrangement 200. A first mixing oscillator 115 is connected to the first modulator 110 and a second mixing oscillator 125 is connected to the second modulator 120. The mixing oscillators 115, 125 with the modulators 110 and 120 are also tasked with establishing phase coherence in antenna arrangements consisting of multiple transmit and receive antennas, such that the signals are able to be combined in a phase-correct manner.

A direct signal conversion or frequency change takes place in the branch of the first modulator 110 and the branch of the second modulator 120. The first modulator 110 modulates the signal on the uplink 30 such that this modulated signal is able to be used directly as radar transmitter signal. The second modulator 120 modulates the potentially preprocessed reception signal such that it is able to be used directly as downlink signal.

The processing unit 100 has two modulators 110, 120 for remodulating the received microwave power with the uplink frequency (frequency of the signal on the uplink 30) $f_{up}$ for the lower radar transmission frequency f RADAR and the radar reception frequency $f_{RADAR}$ for the lower downlink frequency (frequency of the signal on the downlink 40) $f_{Down}$. The power mixers, as is conventional, use active components such as diodes, transistors or tubes or passive components such as inductors or capacitors with changeable parameters. Unlike other mixers, they do not use any DC operating voltage supply, but rather only microwave voltages, similarly to AC/AC converters in power electronics. Only a small portion of the microwave power is rectified and used for some control circuits such as the oscillators 115, 125 and a control unit 400.

In this case, the frequencies of the mixing oscillators 115 and 125 have fixed or variable numerical ratios, $f_1 = 1/k\, f_{up}$ and $f_2 = m/n\, f_1$, in order thus to generate a lower radar transmission and reception frequency $f_{RADAR} = f_{up} - f_1$ and a downlink frequency $f_{down} = f_{RADAR} + f_2$ different therefrom. Simple coherency of all frequencies is in this case achieved using the remote station 20 (also: ground station), which has a highly precise oscillator for the uplink frequency $f_{up}$. In the case of signal processing performed by the data compressor 150 on board the aircraft, this condition may be mitigated; only the two local mixing oscillators 115 with $f_1$ and 125 with $f_2$ need to be in phase for coherent signal processing, for example through a common highly constant frequency source.

A further modulator 130 is arranged between the first modulator 110 and the emission unit 310 in order to allow synchronization to identify radar reflections, phase shifting for active beam steering and distance measurement.

The transmission/reception channel consisting of uplink 30 and downlink 40 may be present multiple times depending on the antenna characteristics in order to generate a broad emission and an angular resolution from the phase shift in multiple reception channels, as is conventional in antennas with electronic beam steering. This step is however carried out in the remote station 20.

Since the wireless power transmission on the uplink 30 is best when it is constant and uniform for an optimum design of the transmission end stages in the remote station 20, the radar signal should advantageously re-emit this power constantly and uniformly as payload signal 315, since it is possible and sensible not to store the microwave power in the aircraft. This emission of the radar transmission power by way of the radar transmission signal 315 may take place in two ways: as a revolving focused beam, wherein each individual power modulator 110 must be able to convert the full power on the uplink and wherein a phase controller performs the electronic beam steering (in this case there is only reception of the reception signal 325 from this narrow beam. Due to the more highly concentrated transmission power, a lower number of integrations of the reception signal 325 is necessary, the overall image is updated only with each beam revolution) or completely as a continuous circular emission or as far as the antenna allows, wherein all individual power modulators 110 together have to deal with the wireless power on the uplink, as a result of which each power modulator 110 may be designed with a lower power. Beam steering may be performed through a revolving phase modulation via the first modulator 110 and/or the further modulator 130 or, in the case of permanent undirected coherent complete emission, be performed through a phase evaluation in the reception channel of the second modulator 120.

The controlling of the payload 300 with the emission unit 310 and reception unit 320 is performed by control signals upmodulated to the signal on the uplink 30 with a very low modulation index (AM, FM, PM, PCM). A central synchronization may also be upmodulated, this thus allowing all receiving ground stations or ships in the reception region of the emitted compressed radar reception signals to perform their own evaluation and display. In the same way, the required control and command signals for the central control unit 400, which is connected to all blocks (not shown) in the processing unit 100 via control and synchronization signal lines, may be transmitted by modulating the uplink 30 with a very low modulation index.

A highly focused microwave beam is used for the wireless signal transmission on the transmission links 30, 40 from the remote station 20 to the high-flying aircraft 1. For a high concentration, the diameter $D_{TX}$ of the transmit antenna of the remote station 20 should be considerably greater than the wavelength $\lambda_{TX}$, $D_{TX} > 100\ \lambda_{TX}$ or even $D_{TX} > 300\ \lambda_{TX}$, or even $D_{TX} > 1000\ \lambda_{TX}$. Since the emission is largely vertical, shorter wavelengths such as $\lambda=3$ cm or $\lambda=0.97$ cm may also be used, which, although they experience higher attenuation in the atmosphere, pass through the highly attenuating clouds vertically, that is to say on the shortest path, and the extent of the attenuation thus remains limited. Short wavelengths also allow high focusing with antenna surfaces that are also possible for mobile ground stations or on ships. Due to the high focusing and thus narrow definition of the microwave energy, the transmit antenna in the remote station must in this case be mechanically steerable or the wireless uplink beam 30 must be electronically steered by phase shifting in the transmit antenna array and may thus follow the precise flight movements of the high-flying aircraft. Due to the high concentration, the receive antenna 210 must also follow the transmit antenna of the remote station through electronic beam steering, that is to say phase shifting between the individual elements of the receive antenna, since mechanical steering would entail an excessively high weight. High focusing is advantageous for good transmission economy, since a majority of the microwave power emitted via the transmit antenna surface $A_{TX}$ is intended to be received with the receive antenna surface $A_{RX}$ of the receive antenna 210 on the aircraft 1 at an altitude of around 20 km or else only at an altitude of 1 km to 2 km.

In this case, the power-transmitting remote station 20 and the receiving system 10 in the aircraft 1 form a cooperative system that selectively adapts the transmission and reception characteristics to one another for optimum power transmission.

The downlink 40 uses a far lower frequency than the uplink 30, resulting in significantly broader emission by the transmit antenna 220 in the aircraft 1. This has the advantage that multiple mutually independent remote stations 20 are able to receive and display the radar reception signal on the downlink 40 for their intended purposes.

The radar emission may be omnidirectional, around the aircraft 1, when such an omnidirectional antenna is able to be installed. This allows a permanent omnidirectional view even with a straight course of the aircraft. As an alternative, an elongate antenna that is able to illuminate only two half-spaces, ahead and behind or to the right and to the left of the circulating flight path of the aircraft, may be used. To obtain a complete image, the aircraft in this case has to circle over land over a relatively unchanging intelligence position, or circle over the movement of a fleet over sea. An elongate antenna may thus considerably simplify the structural design of the aircraft 1.

In order to radiate a search area as effectively as possible with the available transmission energy, the antenna pattern may be vertically steerable in order thereby to compensate for difficulties with the aircraft and the antennas.

The processing unit 100 has a control unit 400 that controls the individual components.

Figure 4:
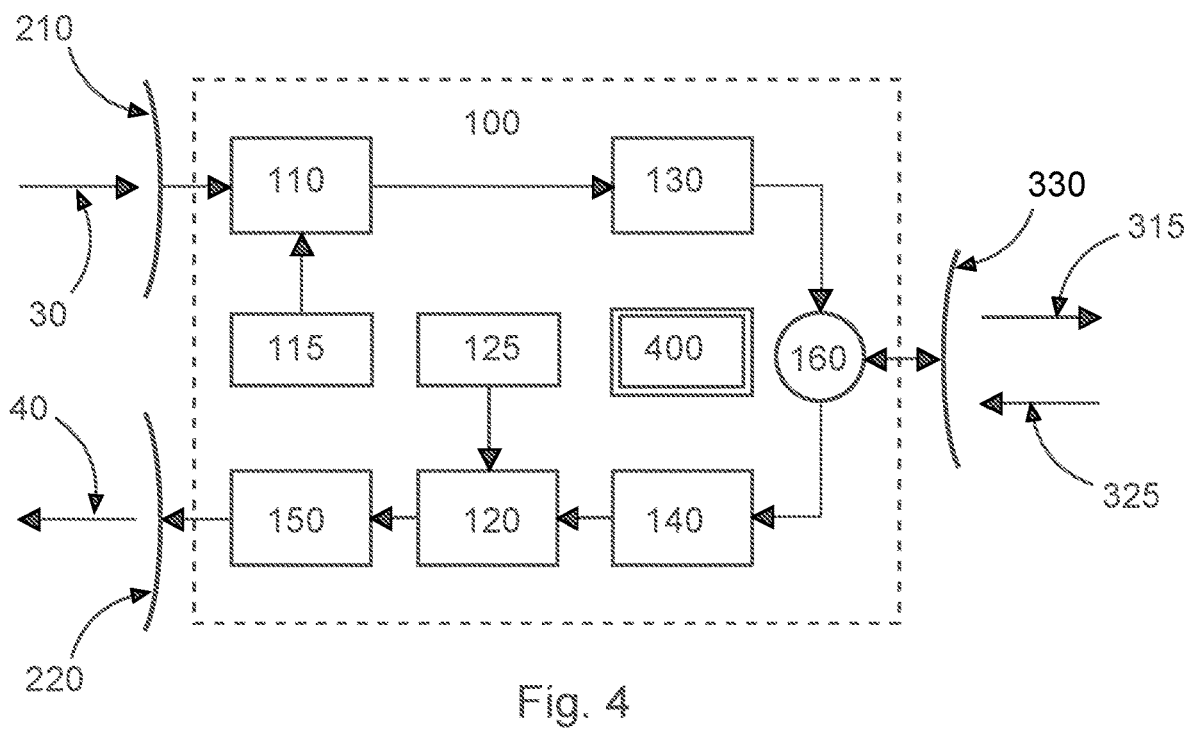
FIG. 4 shows a schematic illustration of the components of an aircraft in an alternative configuration.

With reference to FIG. 3, FIG. 4 shows one alternative configuration of the system 10 for an aircraft 1. In this configuration, provision is made for a combined antenna installation 330 that combines the functions of the emission unit 310 and the reception unit 320 from FIG. 3. The antenna installation 330 sends a radar transmission signal 315. The antenna installation 330 also receives a radar reception signal 325. The radar transmission signal 315 is generated by the processing unit 100 by virtue of the electromagnetic signal on the uplink 30 being modulated (that is to say changed in terms of its frequency). The modulated signal is forwarded to the antenna installation 330 and emitted thereby as radar transmission signal 315. Both signals from and to the antenna installation 330 are split in the processing unit 100 by a circulator or diplexer 160 depending on the signal direction or signal frequency.

Figure 5:
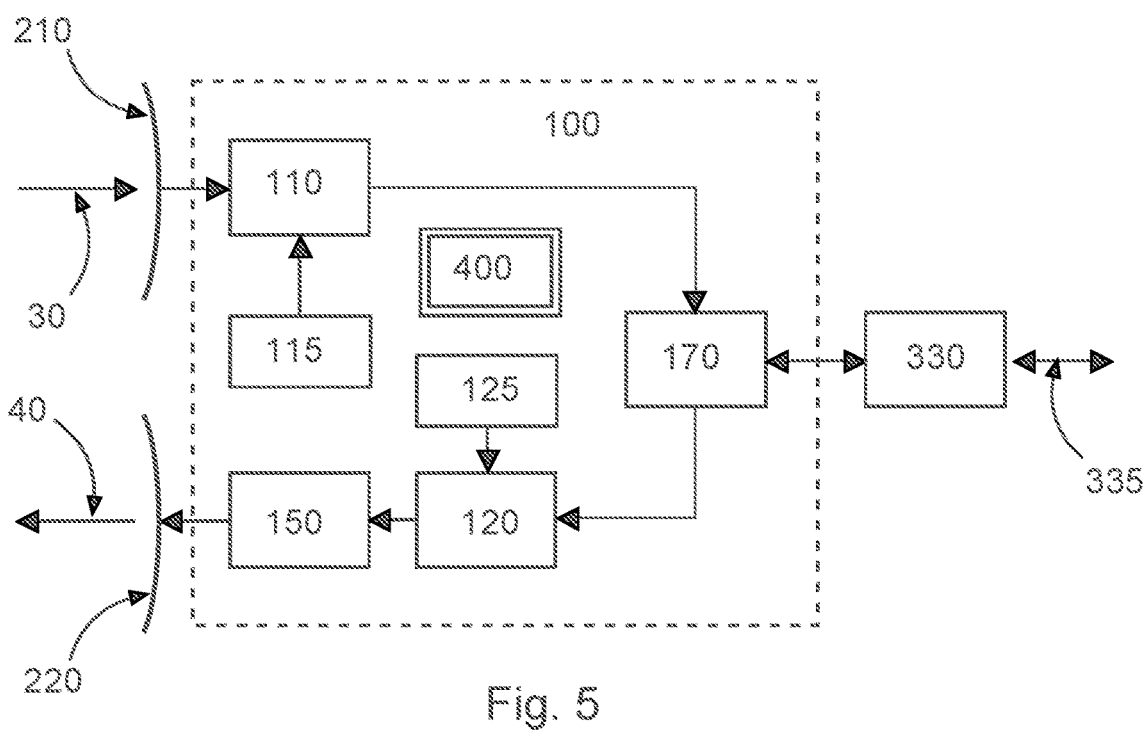
FIG. 5 shows a schematic illustration of the components of an aircraft in an alternative configuration.

With reference to FIG. 3 and FIG. 4, FIG. 5 shows a further alternative configuration of the electronic system 10 for an aircraft 1. An arbitrary communication or measuring facility 330, which is connected to the surroundings via an arbitrary connection 335, is shown here. The other components 110, 115, 120, 125, 150, 400 have the same functions as already described for FIG. 3 and FIG. 4.

The processing unit 100 has a universal data processing unit 170, such as for example a computer, arranged between the modulators 110, 120. The data processing unit is operated with a high-frequency voltage or current supply, obtained from the first modulator 110, and not, as in generally conventional configurations, with one or more DC voltages, which would require a power rectifier in a known configuration. This is possible when the switching elements in the data processing unit 170 are not generally conventional circuits containing a DC voltage or current supply, but rather high-frequency AC circuits with changeable parameters, such as for example parametrons or parametric amplifiers or mixers.

It is additionally pointed out that "comprising" or "having" does not rule out other elements or steps, and "a", "an" or "one" does not rule out a multiplicity. It is furthermore pointed out that features or steps that have been described with reference to one of the above exemplary embodiments may also be used in combination with other features or steps

LIST OF REFERENCE SIGNS 1 aircraft
2 ground unit
10 electronic system
20 remote station
30 uplink
40 downlink
100 processing unit
110 first modulator
115 first mixing oscillator
120 second modulator
125 second mixing oscillator
130 modulator, signal conditioning
140 reception and signal processing unit
150 data compressor
160 circulator, diplexer
170 data processing unit
200 first antenna arrangement
210 receive antenna
220 transmit antenna
300 payload
310 emission unit
315 payload transmission signal
320 reception unit
325 payload reception signal
330 combined transmit and receive antenna installation
335 connection to the surroundings
400 control unit

The invention claimed is:

1. An aircraft comprising:
a first antenna arrangement configured to wirelessly receive electromagnetic signals;
a payload;
a processing unit coupled to the first antenna arrangement and to the payload;
wherein the processing unit is configured to modulate an electromagnetic signal received by the first antenna arrangement and thereby to generate a first modulated signal and to forward the first modulated signal to the payload;
wherein the payload is configured to use the first modulated signal as working signal,
wherein the electromagnetic signal is configured to transmit power for the payload wirelessly from a remote station to the aircraft;
wherein the processing unit is configured to convert the electromagnetic signal into an AC signal without any conversion into a DC signal and without buffer storage of an energy of the electromagnetic signal in an energy storage unit; and
wherein the processing unit is configured to use the electromagnetic signal to directly make available a required radio frequency power for the payload and, following the modulation of the electromagnetic signal, to route the first modulated signal to the payload and use the first modulated signal as the working signal.

2. The aircraft as claimed in claim 1,
wherein the payload is a second antenna arrangement configured to use the first modulated signal as payload transmission signal; or
wherein the payload is a communication installation configured to use the first modulated signal as carrier signal of a wireless communication connection; or
wherein the payload is an intelligence installation configured to use the first modulated signal as transmitter signal; or
wherein the payload is a data processing unit configured to use the first modulated signal as voltage and current supply.

3. The aircraft as claimed in claim 1,
wherein the processing unit has a first modulator;
wherein the first modulator is configured to downmodulate the received electromagnetic signal to a lower frequency to generate the first modulated signal.

4. The aircraft as claimed in claim 3,
wherein the first modulator is configured to apply a coherent modulation to generate the first modulated signal.

5. The aircraft as claimed in claim 1,
wherein the processing unit is configured to convert a portion of the received electromagnetic signal into a DC signal and to use the DC signal as energy supply for components of the aircraft.

6. The aircraft as claimed in claim 1,
wherein the processing unit has a second modulator;
wherein the second modulator is configured to modulate an output signal from the payload to a higher or lower frequency and thereby to generate a second modulated signal.

7. The aircraft as claimed in claim 6,
wherein the processing unit has a data compressor configured to process the second modulated signal.

8. The aircraft as claimed in claim 6, further comprising:
an emission unit and a reception unit;
wherein the emission unit is configured to send the working signal as payload transmission signal;
wherein the reception unit is configured to receive a payload reception signal;
wherein the processing unit is configured to transmit the payload reception signal to the first antenna arrangement to allow transmission to a remote station by way of the electromagnetic signal to be sent.

9. A system comprising an aircraft and a ground unit;
wherein the aircraft is an aircraft as claimed in claim 1;
wherein the ground unit is arranged outside the aircraft;
wherein the ground unit is configured to wirelessly transmit an electromagnetic signal to the aircraft via an uplink and to receive signals from the aircraft via a downlink.

10. The system as claimed in claim 9,
wherein the ground unit is arranged on the Earth's surface.

* * * * *